2,824,116
SYNTHESIS OF HYDROCARBONS WITH A CATALYST CONTAINING LEAD DEPOSITED FROM A TETRAALKYL LEAD

Thomas P. Wilson, Charleston, W. Va., assignor to Union Carbide Corporation, a corporation of New York No Drawing. Application November 16, 1954
Serial No. 469,309
4 Claims. (Cl. 260—449.6)

This invention relates to an improvement in the synthesis of hydrocarbons from carbon monoxide and hydrogen whereby the yield of gaseous olefins is greatly improved.

In the normal operation of the hydrocarbon synthesis process in the presence of iron catalysts, the gaseous hydrocarbons produced are predominantly of the paraffin series which are less valuable than the corresponding olefins. According to this invention, hydrocarbons are formed by the reaction of carbon monoxide and hydrogen in the presence of iron catalysts subjected to the action of a volatile compound of lead. By this means, the gaseous hydrocarbons formed in the reaction are predominantly of the more desirable olefinic series.

Treatment of the iron catalysts with the volatile lead compounds is carried out by passing the lead compounds over the activated catalysts at an elevated temperature sufficient to decompose the lead compound whereby lead is distributed over the catalyst. To achieve a uniform distribution of the lead, the iron catalyst is preferably maintained as a fluid bed during the treatment, and the volatile lead compound is introduced as a vapor with a carrier gas used to fluidize the catalyst bed. A convenient carrier gas for this purpose is frequently the synthesis gas which is composed of carbon monoxide and hydrogen.

Treatment of the iron catalyst with lead increases the formation of gaseous olefins accompanied by a slight decrease in the activity of the catalyst as measured by the conversion of synthesis gas to total hydrocarbons at a given reaction temperature. The effect of the lead treatment on the formation of gaseous olefins persists for a prolonged period of operation but gradually decreases. However, on further treatment of the catalyst with the volatile lead compound, the concentration of gaseous olefins in the hydrocarbon products was again found to increase.

A preferred class of volatile lead compounds for use in this invention are the tetraalkyl compounds of lead, such as tetramethyl lead, tetraethyl lead, tetrapropyl lead, diethyldipropyl lead, diethyldibutyl lead, and the like. The tetraalkyl lead compounds are easily vaporized with the synthesis gas and decompose at reaction temperatures of 200° C. to 450° C. to distribute lead throughout the catalyst bed. The amount of lead introduced to the catalyst as a volatile lead compound is not large, and such amounts (based on the lead content of the lead compound) may vary from 0.1% to 5% by weight of the catalyst as a total in a single period of treatment.

The following examples will illustrate the practice of this invention:

EXAMPLE 1

A magnetic iron ore concentrate was crushed and ground to a particle size range of 60 to 200 mesh so that it was capable of being fluidized. One hundred and seventy-five (175) grams of the catalyst was placed in a one-inch I. D. reactor and reduced for approximately 24 hours with hydrogen which was passed over the catalyst at 525° C. at atmospheric pressure and with a space velocity of 500.

Synthesis was then started with the reduced catalyst by passing synthesis gas ($2H_2$:$1CO$) at 200 p. s. i. g. with a space velocity of 8000 over the catalyst at 290° C. The conversion at this point was 33% and the olefin content of the $C_2$–$C_4$ fraction was 33%. The pressure and space velocity were then lowered to 60 p. s. i. g. and 2500, respectively, whereupon the conversion rose to 45%, but the olefin content of the $C_2$–$C_4$ fraction remained about the same.

The synthesis gas was then passed through a saturator containing tetraethyl lead at 20° C. The amount of lead added to the gas as tetraethyl lead amounted to 0.1 gram (.16 gram of $Pb(C_2H_5)_4$) per hour. Addition of lead tetraethyl at this rate continued for eleven hours, after which it was necessary to raise the reaction temperature to 328° C. to obtain a conversion of 26% in the synthesis reaction. The rate of addition of lead as lead tetraethyl was then raised to one gram per hour for a period of one hour by raising the saturator temperature to 60° C. After the last addition of lead, it was necessary to raise the reaction temperature to 400° C. to obtain a reaction conversion of 30%.

Addition of lead in the manner described caused a marked increase in the olefin content of the $C_2$–$C_4$ fraction as shown in the data tabulated below:

| Age of Catalyst, hours | 3 | 15 | 24 | 26 | 28 |
|---|---|---|---|---|---|
| Total lead added, grams | 0 | 1 | 2 | 2 | 2 |
| Inlet space velocity,a s. c. f./hr./c. f. of catalyst | 8,000 | 2,600 | 2,550 | 2,650 | 2,750 |
| Pressure, p. s. i. g | 200 | 60 | 60 | 60 | 60 |
| Temperature, ° C | 290 | 328 | 400 | 400 | 400 |
| Conversion, percent b | 33 | 26 | 25 | 28 | 32 |
| Olefins in $C_2$–$C_4$ Fraction, percent | 33 | 70 | 91 | 87 | 87 |
| Water-Carbon dioxide ratio in exit gases as $CO_2/(CO_2+H_2O)$, Mole percent | 14 | 19 | 14 | 15 | 22 | a Based on original packed volume of unreduced catalyst.

b Percent Conversion = $\frac{\text{Volumes of } (CO_2+H_2) \text{ reacted}}{\text{Total volumes of fresh feed gas}} \times 100$

EXAMPLE 2

In another experiment, using a fluidized reduced taconite concentrate catalyst, a similar increase in the formation of gaseous olefins occurred upon the addition of tetraethyl lead. A detailed analysis of the products formed was made, as shown in the data below:

| Age of catalyst on stream, hours | 4 | 14 | a 19 |
|---|---|---|---|
| Total lead added, grams | 0 | 1 | 1 |
| Inlet space velocity, s. c. f./hr./c. f. of catalyst | 2,600 | 2,650 | 2,850 |
| Pressure, p. s. i. g | 60 | 60 | 60 |
| Temperature, ° C | 290 | 338 | 370 |
| Conversion, percent | 26 | 32 | 48 |
| Constituent, percent of total hydrocarbons, carbon atom basis b: | | | |
| $CH_4$ | 24.5 | 22.8 | 32 |
| $C_2H_4$ | 1.3 | 9.1 | 9.4 |
| $C_2H_6$ | 13.2 | 1.8 | 3.7 |
| $C_3H_6$ | 7.0 | 13.2 | 14.1 |
| $C_3H_8$ | 7.6 | 1.5 | 1.6 |
| $C_4H_8$ | 2.6 | 6.5 | 8.2 |
| $C_4H_{10}$ | 5.5 | 4.1 | 2.2 |
| $C_5$ | 9.6 | 5.9 | 5.9 |
| $C_6+$ | 20 | 18 | 18 |
| | 91.3 | 82.9 | 95.1 |
| $C_2$–$C_4$ Olefin | 10.9 | 28.8 | 31.7 |
| $C_2$–$C_4$ Paraffin | 26.3 | 7.4 | 7.5 |
| Olefin in $C_2$–$C_4$ Fractions, Percent | 29 | 80 | 81 |
| $CO_2/(CO_2+H_2O)$, Mole Percent | 37 | 39 | 45 | a After 14 hours, the catalyst was reduced with hydrogen for 12 hours at 450° C. and one atmosphere pressure.

b For example, in a gas mixture whose components are in the ratio of 2 molecules of methane-$CH_4$ (1 carbon atom per molecule), 1 molecule of ethane-$C_2H_6$ (2 carbon atoms per molecule) and 2 molecules of propane-$C_3H_8$ (3 carbon atoms per molecule) there will be a total of ten carbon atoms in five molecules of the mixture, and the percentage distribution of the hydrocarbons on a carbon atom basis is computed as follows:

$$CH_4 = \frac{2 \times 1 \times 100}{10} = 20\%$$

$$C_2H_6 = \frac{1 \times 2 \times 100}{10} = 20\%$$

$$C_3H_8 = \frac{2 \times 3 \times 100}{10} = 60\%$$

EXAMPLE 3

A longer experiment was run than the preceding two examples in which tetraethyl lead was added at intervals to the synthesis gas and passed through a fluidized iron catalyst to determine the frequency at which lead should be added to maintain a high formation of gaseous olefins. The conditions and results of the run are given below; the amount of lead added being that stated resulting from the introduction of larger amounts of lead tetraethyl.

Conditions

| | |
|---|---|
| Catalyst | 300 grams of reduced magnetic iron ore. |
| Synthesis gas | $2H_2:1CO$. |
| Pressure | 200 p. s. i. g. |
| Space velocity | 2900. |

Results

| Catalyst Age, Hours | Gms. Lead Added at Times Stated | Temperature, °C. | Conversion, Percent | Percent $C_2$-$C_4$ olefins in Total Hydrocarbon product, by weight |
|---|---|---|---|---|
| 14 | 0 | 248 | 17.3 | 25 |
| 34 | 2.8 | 293 | 19.7 | 41 |
| 76 | | 307 | 35 | 36 |
| 117 | | 302 | 35 | 32 |
| 133 | 1.35 | 312 | 32 | 36 |
| 215 | | 300 | 32 | 34 |
| 229 | 0.65 | 292 | 32 | 33 |
| 238 | 0.87 | 325 | 45 | 37 |
| 247 | | 315 | 43 | 31 |
| 249 | 0.59 | 318 | 43 | 36 |

These results show that an increase in olefin fraction occurred following each introduction of lead during the period covered by the data of slightly over ten days. The increased conversions with the lead treated catalyst were caused by the temperature increases recorded in the table.

What is claimed is:

1. Process for the synthesis of hydrocarbons which comprises treating an iron base synthesis catalyst with the vapor of a tetraalkyl lead at a temperature above the decomposition point of said tetraalkyl lead to form a catalyst containing from 0.1% to 5% by weight of lead, passing over the catalyst thus treated a gaseous mixture of carbon monoxide and hydrogen at synthesis conditions of temperature and pressure, and forming a mixture of hydrocarbons in which the $C_2$ to $C_4$ fraction is predominantly olefinic.

2. Process for the synthesis of hydrocarbons which comprises treating an iron base synthesis catalyst with the vapor of tetraethyl lead at a temperature above the decomposition point of said tetraethyl lead to form a catalyst containing from 0.1% to 5% by weight of lead, passing over the catalyst thus treated a gaseous mixture of carbon monoxide and hydrogen at synthesis conditions of temperature and pressure, and forming a mixture of hydrocarbons in which the $C_2$ to $C_4$ fraction is predominantly olefinic.

3. Process for the synthesis of hydrocarbons which comprises depositing lead in greater than trace amounts from the vapors of tetraalkyl lead at a temperature above the decomposition point of said tetraalkyl lead on an iron base synthesis catalyst, passing over the catalyst thus treated a gaseous mixture of carbon monoxide and hydrogen at synthesis conditions of temperature and pressure to cause the formation of a mixture of hydrocarbons in which the $C_2$ to $C_4$ fraction is predominantly olefinic.

4. The process of claim 3 wherein the tetraalkyl lead compound is tetraethyl lead.

References Cited in the file of this patent

UNITED STATES PATENTS

| | | |
|---|---|---|
| 2,593,250 | Black et al. | Apr. 15, 1952 |

FOREIGN PATENTS

| | | |
|---|---|---|
| 362,814 | Germany | Nov. 2, 1922 |
| 524,201 | Great Britain | Aug. 1, 1940 |

OTHER REFERENCES

Ser. No. 268,381, Kaufmann (A. P. C.), published July 13, 1943.

Calingaert: "The Organic Compounds of Lead," Chemical Reviews, vol. 2 (1925–6), pages 43 and 77.